Patented July 21, 1942

2,290,235

UNITED STATES PATENT OFFICE 2,290,235

PEST CONTROL

Hubert G. Guy, Newark, Del., assignor to E. I. du Pont de Nemours & Company, Wilmington, Del., a corporation of Delaware No Drawing. Application November 17, 1938, Serial No. 240,957

5 Claims. (Cl. 167—22)

This invention relates to horticultural spray compositions for applying organic feeding inhibitors to foliage and has for its general objects the provision of ways and means for obtaining heavy uniform spray deposits which are not readily washed from the foliage by rain, which objects are generally accomplished by precipitating in the spray suspension an insoluble metallic hydroxide compatible with the organic feeding inhibitor.

In recent years there have been developed a number of new organic feeding inhibitors which are not only more effective than the common inorganic compounds, such as lead arsenate, similarly employed, but also have distinct advantages over such inorganic compounds in that they do not leave objectionable toxic residue on the crops. In many instances, however, it has been found difficult to apply sufficiently heavy loads to obtain the maximum effectiveness of the organic feeding inhibitors and frequently, even if heavy loads are obtainable, the spray deposit is not sufficiently resistant to rainfall.

Efforts to reduce or overcome these disadvantages by the inclusion of suitable organic stickers have not entirely solved the problem. Some stickers while giving high initial spray deposits give blotchy and non-uniform coverage. Others do not afford the necessary resistance to rainfall. Others, while giving good initial coverage and good resistance, materially reduce the effectiveness of the active agent.

I have now found that spray deposits of organic feeding inhibitors can be improved with respect to load coverage and resistance to rainfall by precipitating in the spray suspension of the organic feeding inhibitor an insoluble metallic hydroxide compatible with the organic feeding inhibitor. More particularly I have found that these desirable results may be achieved by incorporating in the spray suspension of the organic feeding inhibitor a soluble metallic salt, the hydroxide of which is insoluble and compatible with the organic feeding inhibitor, and precipitating the hydroxide by double decomposition.

By precipitating an insoluble hydroxide in the spray suspension the particles of the organic feeding inhibitor suspended therein apparently act as nuclei to adsorb the particles of the precipitated hydroxide as the latter are formed. It is possible that the particles of hydroxide so precipitated act to load the relatively light particles of the organic feeding inhibitor and also as an adhesive to fix them to the foliage. Whatever the explanation I have been able consistently to obtain better coverage and coverage more resistant to rainfall than with the usual organic adhesives commonly employed in such spray suspensions.

My invention may be carried into effect practically by dispersing the organic feeding inhibitor in water in the usual manner, incorporating therein a soluble metallic salt, the hydroxide of which is insoluble and compatible with the organic feeding inhibitor, and precipitating the hydroxide by suitable alkali such as hydrated lime. I may employ hydrated lime not only because this product is relatively inexpensive and readily available for pest control purposes but also because it is relatively insoluble and has but feebly basic properties. Similarly, the metallic salt may be a sulfate, not only because sulfates are inexpensive and readily available but also because they react with hydrated lime to precipitate insoluble calcium sulfate. It has been found generally desirable to keep the amount of soluble salts in the spray suspension at a minimum, and for this purpose I have found that the metallic sulfates and hydrated lime are suitable.

As illustrative of my invention I may cite the following, taken with reference to the use of tetra methyl thiuram disulfide as a repellent for the Japanese beetle. A suitable dispersible composition was prepared by milling tetra methyl thiuram disulfide, Bancroft clay and bentonite with dodecyl alcohol in the following proportions:

| | Per cent |
|---|---|
| Tetra methyl thiuram disulfide | 80 |
| Bancroft clay | 14 |
| Bentonite | 5 |
| Dodecyl alcohol | 1 |

This composition disperses readily in water and yields good initial loads. On exposure to rainfall, however, the active agent, that is, the tetra methyl thiuram disulfide, tends to wash out with a consequent loss of efficiency in the protection obtained. By the addition of a suitable metallic sulfate and hydrated lime to these spray suspensions improved coverage and improved resistance to rainfall was obtained. The following table illustrates the effect of various insoluble hydroxides:

Table I

| Composition | Concentration | Initial spray coverage | Exposed to artificial rainfall |
|---|---|---|---|
| | Lbs./100 gal. | Micrograms per sq. in. | Micrograms per sq. in. |
| Tetra methyl thiuram disulfide (compounded) | 2½ | 93 | 61 |
| Tetra methyl thiuram disulfide (compounded) | 2½ | 121 | 76 |
| Zinc sulfate 7H₂O | 1 | 109 | 86 |
| Hydrated lime | 1 | | |
| Tetra methyl thiuram disulfide (compounded) | 2½ | 86 | 72 |
| Magnesium sulfate | 1 | 98 | 67 |
| Hydrated lime | 1 | | |
| Tetra methyl thiuram disulfide (compounded) | 2½ | 104 | 77 |
| Cadmium sulfate | 1 | 108 | 87 |
| Hydrated lime | 1 | | |
| Tetra methyl thiuram disulfide (compounded) | 2½ | 124 | 95 |
| Aluminum sulfate 18H₂O | 1 | | |
| Hydrated lime | 1 | | |

The load determinations as given in the above table and the tables following were made in the following manner. Bean plants of the same stage of maturity, so as to present as nearly as possible the same type of foliage, were sprayed on a standard rotary spray table. Twelve plants were used for each spray and the sprayed plants were allowed to dry over night. Half of the plants were then replaced on the rotary spray table and sprayed with water to approximate heavy rainfall. Leaves selected at random from the several sprayed plants were then washed with chloroform to dissolve the tetra methyl thiuram disulfide. Only one side of each leaf was washed. The area of the leaves was then determined by a planimeter and the corresponding amount of thiuram sulfide determined by analysis. The loads given in the tables consequently represent micrograms of tetra methyl thiuram disulfide per square inch of leaf surface.

Feeding tests were also conducted with spray compositions prepared according to my invention. In these tests plants sprayed in the manner described above were exposed to adult Japanese beetle by the Standard Cage Method. The following table shows the effect of exposure to artificial rainfall on the repellent efficiency:

Table II

| Composition | Concentration | Initial spray coverage, per cent foliage eaten | Exposed to artificial rainfall, per cent foliage eaten |
|---|---|---|---|
| | Lbs./100 gal. | | |
| Tetra methyl thiuram disulfide (compounded) | 2½ | | |
| Zinc sulfate 7H₂O | 2 | 3 | 3 |
| Hydrated lime | 2 | | |
| Tetra methyl thiuram disulfide (compounded) | 2½ | | |
| Zinc sulfate 7H₂O | ½ | 3 | 10 |
| Hydrated lime | ½ | | |
| Tetra methyl thiuram disulfide (compounded) | 2½ | | |
| Zinc sulfate 7H₂O | ⅔ | 5 | 15 |
| Hydrated lime | ⅔ | | |
| Tetra methyl thiuram disulfide (compounded) | 2½ | | |
| Aluminum sulfate 18H₂O | 2 | 15 | 15 |
| Hydrated lime | 2 | | |

In another series of tests data was taken both as to coverage and a repellent efficiency. These data are given in the following table:

Table III

| Composition | Concentration | Initial spray coverage | | Exposed to artificial rainfall | |
|---|---|---|---|---|---|
| | | Micrograms per sq. in. | Per cent foliage eaten | Micrograms per sq. in. | Per cent foliage eaten |
| Tetra methyl thiuram disulfide (compounded) | Lbs./100 gal. 2½ | 115 | 15 | 71 | 26 |
| Do | 2½ | 130 | 11 | 115 | 14 |
| Zinc sulfate 7H₂O | 1 | | | | |
| Hydrated lime | 1 | | | | |

My invention contemplates the use of various expedients for causing the precipitation of the insoluble hydroxide in the spray suspension. For example, the precipitation may be effected by means of a water-soluble salt with the addition of a suitable alkali or it may be effected by the addition of a salt of a very feeble base and a very feeble acid which hydrolyzes in the suspension to yield the insoluble hydroxide. In other words, I may effect the precipitation by the addition of a material which is decomposed by water to yield an insoluble hydroxide or a material which undergoes double decomposition on being added to the spray suspension and yields as one of the products of the double decomposition an insoluble metallic hydroxide. In such reactions I mean to include cases of simple hydrolysis, since such a reaction is in its nature essentially a double decomposition reaction involving water rather than a base.

In carrying out my invention materials which yield insoluble products may be used advantageously to avoid any appreciable concentration of soluble salts in the spray suspension. For example, the products of the double decomposition of hydrated lime and zinc sulfate, namely, zinc hydroxide and calcium sulfate, are both insoluble. For the same reasons relatively insoluble alkalies, such as hydrated lime, are advantageous.

Further to reduce the amount of metal in solution in the suspension I may employ an excess of alkali that is, an amount in excess of the stoichiometric proportions. In such case the alkali used should have feebly basic properties so as not to impart too great an alkalinity to the spray suspension. Hydrated lime is entirely satisfactory and is probably the most readily available of such alkalies. It has advantage not only because of its feeble basic nature but because of its insolubility. Other alkalies having basic properties of the same order of hydrated lime may be used with like advantage.

Except when strong alkalies are employed the amount is not especially critical. Thus with hydrated lime or alkalies having an equivalent basicity it will ordinarily be found sufficient to use approximately equal proportions of alkali and metallic salts, whether figured on the basis of the hydrous or anhydrous salt. I prefer not to employ more than three or four parts of the alkali to each part of the metallic salt (figured as anhydrous), since it appears that the larger the amount of alkali the less resistant the spray deposit is to rainfall. When alkalies substantially stronger than hydrated lime are employed the amounts are more critical since an excess may deleteriously affect the basicity of the spray suspension. With such alkalies it is preferable to employ not substantially more than the stoichiometric proportions. Having these considerations in mind those skilled in the art will be able readily to determine the amount of alkali most suitable for the particular conditions involved. I do not wish, therefore, to limit my invention to any particular amounts.

While my invention in its broader aspects contemplates the use of soluble salts of any metals the hydroxide of which is insoluble, I have found that markedly superior results are obtained with the soluble salts of the amphoteric or heavy metals. Such metals yield amphoteric hydroxides which are principally characterized by their tendency to precipitate as a flocculent or gelatinous precipitate. Precipitates of this character, such as zinc, cadmium, and almuminum hydroxides, are more effective in increasing the load and, moreover, yield deposits which are more resistant to rainfall.

In dealing with certain organic compounds used as feeding inhibitors, especially certain organic sulfur compounds such as the thiuram disulfides, a further consideration is involved in regard to the compatibility of the organic compound and the metal hydroxide. I have found, for example, that the thiuram sulfides are readily oxidized by the easily reducible metallic ions such as ferric iron, cupric copper and other metals which may exist in solution in several states of valency. Such metals, of course, cannot be considered as compatible with the thiuram sulfides. In such case I prefer to employ metals of the non-oxidizing type and which are distinctively characterized in that they exist in aqueous solution in but a single state of oxidation or valency. Of the metals of this type zinc, cadmium, and aluminum, as already mentioned, are preferred in view of the flocculent nature of their hydroxides.

With the amphoteric metals I have observed some tendency toward blotchy and non-uniform coverage. I have found, that this may be avoided by using a proper quantity of hydrated lime. Thus, if such a condition is encountered, it may be remedied by increasing the amount of lime. Too large an excess of lime, however, should be avoided since as already pointed out excessive amounts of lime tend to cause excessive run-off. It has been found desirable, therefore, to strike a balance between these two factors and to adjust the amount of lime accordingly.

In this regard it may be observed that the various conditions of application, particularly with respect to the type of foliage and the state of its development, makes it impossible to set any hard and fast rule as to the relative proportions of lime and soluble metallic salt which will give the most desirable results. As a general rule, however, I have found that it is desirable to keep the lime to less than three or four parts by weight for each part of the soluble metallic salt (figured as anhydrous).

My observations also indicate that when relatively large particles are dispersed in the spray suspension the run-off is increased. This may account for the deleterious effect previously mentioned due to excessive quantities of hydrated lime. This disadvantage consequently may be mitigated by precipitating the lime in the spray suspension. For example, I may dissolve the soluble metallic salt in the spray suspension together with a soluble calcium salt and effect concurrent precipitation of the metallic hydroxide and the calcium hydroxide.

My invention not only contemplates the preparation of horticultural spray suspensions in the manner described above but also the formulation of novel compositions which when dispersed in water will give substantially the same results. The compositions are dry mixtures which contain in addition to the dispersible organic feeding inhibitor the desired amounts of alkali and water-soluble metallic salt of the character described. When the several ingredients are dry mixed, the active agent of the organic feeding inhibitor first being placed in dispersible form, the resulting mixture may be dispersed in water with substantially the same advantages described above. Should absorption of moisture tend to cause interaction between the alkali and metallic salt in such dry mixtures suitable conditioning agents such as starch may be included.

However prepared the amount of soluble metallic salt to be incorporated in the spray suspension will be governed by the exigencies of the particular conditions. Those skilled in the art will readily be able to determine the proper amounts, depending upon the type of foliage sprayed and the type of feeding inhibitor employed. It may be noted, however, that since horticultural spray suspensions are usually quite dilute, involving only a few pounds per hundred gallons, the amount of water-soluble salt introduced into the spray suspension will ordinarily be less than one or two tenths of one per cent figured as the anhydrous salt, and seldom less than three hundredths of one per cent or more than three tenths of one per cent. Consequently, for the purposes of my invention salts which ordinarily would be considered as relatively insoluble may be used and are to be considered as coming within the terminology, water-soluble salt.

While my invention is directed particularly to obtaining improved spray deposits with the thiuram sulfide repellents for the control of the Japanese beetle, it will be evident that in its broader aspects it extends also to other types of organic feeding inhibitors whether of the repellent or stomach poison type. It is particularly useful, however, with respect to the thiuram sulfide repellents as described and set forth in the U. S. Patent 2,205,232, granted June 18, 1940, which for economic reasons require effective retention of the active agent and for biological reasons require uniform coverage. These ends are best accomplished by precipitating in the spray suspension an amphoteric hydroxide of a non-oxidizing metal.

Since many apparently widely differing embodiments of my invention may be made it is to be understood that such variations as come within the scope and spirit thereof are to be included within the appended claims.

I claim:

1. The method of conditioning horticultural spray suspensions for obtaining heavy uniform spray deposits, which are not readily washed from foliage by rain, of organic feeding inhibitors containing a thiuram sulfide which comprises dispersing in water a water-insoluble organic feeding inhibitor containing a thiuram sulfide, a water-soluble salt of a non-oxidizing metal the hydroxide of which is insoluble, and lime in proportions of not more than four parts for each part of said water-soluble salt figured as anhydrous, said salt being such that on interacting with lime to form said hydroxide and insoluble calcium salt is formed.

2. The method of conditioning horticultural spray suspensions for obtaining heavy uniform spray deposits, which are not readily washed from foliage by rain, of organic feeding inhibitors containing a thiuram sulfide which comprises dispersing in water a water-insoluble organic feeding inhibitor containing a thiuram sulfide, a water-soluble salt of a metal selected from the class consisting of zinc, cadmium, and aluminum, and lime in proportions of not more than one part for each part of said water-soluble salt figured as anhydrous.

3. The method of conditioning horticultural spray suspensions for obtaining heavy uniform spray deposits, which are not readily washed from foliage by rain, of organic feeding inhibitors containing a thiuram sulfide which comprises dispersing in water a water-insoluble organic feeding inhibitor containing a thiuram sulfide, a water-soluble salt of zinc, and lime in proportions of not more than one part for each part of said zinc salt figured as anhydrous.

4. The method of conditioning horticultural spray suspensions for obtaining heavy uniform spray deposits, which are not readily washed from foliage by rain, of organic feeding inhibitors containing a thiuram sulfide which comprises dispersing in water a water-insoluble organic feeding inhibitor containing a thiuram sulfide, a water-soluble salt of aluminum, and lime in proportions of not more than one part for each part of said aluminum salt figured as anhydrous.

5. The method of conditioning horticultural spray suspensions for obtaining heavy uniform spray deposits, which are not readily washed from foliage by rain, of organic feeding inhibitors containing a thiuram sulfide which comprises dispersing in water a water-insoluble organic feeding inhibitor containing a thiuram sulfide, a water-soluble salt of cadmium, and lime in proportions of not more than one part for each part of said cadmium salt figured as anhydrous.

HUBERT G. GUY.